(12) United States Patent
Hatakeyama et al.

(10) Patent No.: US 10,908,301 B2
(45) Date of Patent: Feb. 2, 2021

(54) RADIATION MONITOR

(71) Applicant: HITACHI, LTD., Tokyo (JP)

(72) Inventors: Shuichi Hatakeyama, Tokyo (JP); Takahiro Tadokoro, Tokyo (JP); Yuichiro Ueno, Tokyo (JP); Yasushi Nagumo, Tokyo (JP); Katsunori Ueno, Tokyo (JP); Kouichi Okada, Tokyo (JP)

(73) Assignee: HITACHI, LTD., Tokyo (JP)

( * ) Notice: Subject to any disclaimer, the term of this patent is extended or adjusted under 35 U.S.C. 154(b) by 17 days.

(21) Appl. No.: 16/415,052

(22) Filed: May 17, 2019

(65) Prior Publication Data

US 2020/0064495 A1 Feb. 27, 2020

(30) Foreign Application Priority Data

Aug. 21, 2018 (JP) .................................. 2018-154488

(51) Int. Cl.
*G01T 1/20* (2006.01)

(52) U.S. Cl.
CPC .................................. *G01T 1/2006* (2013.01)

(58) Field of Classification Search
CPC .................................................. G01T 1/2006
See application file for complete search history.

(56) References Cited

U.S. PATENT DOCUMENTS

| | | | |
|---|---|---|---|
| 3,982,128 A | 9/1976 | Groch et al. | |
| 4,870,667 A * | 9/1989 | Brunnett | G01T 1/2018 378/19 |
| 5,008,546 A | 4/1991 | Mazziotta et al. | |
| 5,138,167 A * | 8/1992 | Barnes | G01T 1/2018 250/363.02 |
| 5,393,981 A * | 2/1995 | Szabo | G01T 3/06 250/367 |
| 5,481,114 A | 1/1996 | Daniel et al. | |
| 6,479,829 B1 * | 11/2002 | Katagiri | G01T 1/20 250/390.11 |
| 7,536,911 B2 * | 5/2009 | Kim | G01M 5/0033 250/227.18 |
| 2003/0001122 A1 * | 1/2003 | Shimizu | G01N 21/6452 250/584 |

(Continued)

FOREIGN PATENT DOCUMENTS

| EP | 2 120 065 A2 | 11/2009 |
|---|---|---|
| EP | 3 318 898 A1 | 5/2018 |

(Continued)

OTHER PUBLICATIONS

Extended European Search Report received in corresponding European Application No. 19176356.4 dated Dec. 6, 2019.

*Primary Examiner* — Blake C Riddick
(74) *Attorney, Agent, or Firm* — Mattingly & Malur, PC (57) ABSTRACT

A radiation monitor according to the present invention includes: a radiation sensing unit which includes phosphors emitting a photon with respect to an incident radiation; and a photon sending unit which sends the photon emitted from the phosphors of the radiation sensing unit, wherein the phosphors form a multilayer structure including a first phosphor and a second phosphor, and a photon absorbing layer absorbing a photon emitted from a phosphor is provided between the first phosphor and the second phosphor.

9 Claims, 10 Drawing Sheets

(56) References Cited

U.S. PATENT DOCUMENTS

| | | | |
|---|---|---|---|
| 2006/0151708 A1* | 7/2006 | Bani-Hashemi | G01T 1/2018 250/370.11 |
| 2007/0065070 A1* | 3/2007 | Berger | G01N 21/7703 385/12 |
| 2009/0261261 A1* | 10/2009 | Rodgers | G01T 1/2008 250/370.11 |
| 2010/0200758 A1* | 8/2010 | Fukuda | G01T 1/2018 250/362 |
| 2012/0068084 A1* | 3/2012 | Li | A61N 5/1048 250/473.1 |
| 2013/0099125 A1* | 4/2013 | Grodzins | G01T 3/06 250/362 |
| 2014/0124676 A1* | 5/2014 | Hedler | G01T 1/28 250/366 |
| 2014/0218341 A1* | 8/2014 | Ichieda | G06F 3/0425 345/175 |
| 2015/0123002 A1* | 5/2015 | Ueno | G01T 1/10 250/362 |
| 2015/0307777 A1* | 10/2015 | Fukuda | G01T 3/06 250/390.11 |
| 2016/0054454 A1* | 2/2016 | Kato | G01N 23/046 378/19 |
| 2016/0073983 A1* | 3/2016 | Miyazaki | A61B 6/482 250/369 |
| 2017/0315241 A1 | 11/2017 | Tadokoro et al. | |
| 2018/0299355 A1* | 10/2018 | Young | G01N 15/06 |
| 2020/0041662 A1* | 2/2020 | Lu | G01T 1/2008 |

FOREIGN PATENT DOCUMENTS

| | | |
|---|---|---|
| JP | 2016-114392 A | 6/2016 |
| WO | 2005/008287 A1 | 1/2005 |

\* cited by examiner

RADIATION MONITOR

CROSS-REFERENCE TO RELATED APPLICATION

The present application claims priority from Japanese application JP 2018-154488, filed on Aug. 21, 2018, the contents of which is hereby incorporated by reference into this application.

BACKGROUND OF THE INVENTION

1. Field of the Invention

The present invention relates to a radiation monitor including phosphors which emit a photon with respect to an incident radiation.

2. Description of the Related Art

Conventionally, an ionization chamber, a Geiger-Müller (GM) counter, a scintillation detector, and a semiconductor detector have been used as a radiation monitor which measures a radiation dose rate. In particular, a semiconductor detector is applied to a radiation monitor which is capable of performing measurement in a low dose rate environment. The radiation monitor using the semiconductor detector has been used in, for example, a nuclear power plant, a nuclear fuel reprocessing facility, or a medical facility, an industrial facility, a research accelerator facility, a general environment monitoring apparatus, or the like, in which a radioactive isotope is used. The radiation monitor using the semiconductor detector uses an electron-hole pair generated by incidence of a radiation to derive a dose rate from a counting rate of an electric pulse generated by a voltage applied to a semiconductor.

Meanwhile, the semiconductor detector applies a high voltage, which entails a risk of explosion when a concentration of hydrogen in the air is high. In addition, since an electric pulse signal generated from the semiconductor is used, it is likely that an electric noise is transmitted to or received from another measurement device.

An example of a detector capable of preventing explosion and suppressing an electric noise includes an optical fiber radiation detector (for example, JP 2016-114392 A). The optical fiber radiation detector sends a plurality of photons generated by an incident radiation to an optical fiber, and measures a dose rate based on a single photon counting rate, such that it is not necessary to feed power to a radiation sensing unit and it is possible to suppress reception and transmission of an electric noise.

The present inventors have suggested in JP 2016-114392 A that a light emitting unit emitting light with an intensity corresponding to a dose rate of an incident radiation is formed of a light transmitting material such as transparent yttrium aluminum garnet (a crystal with a garnet structure formed of a compound oxide ($Y_3Al_5O_{12}$) of yttrium and aluminum) as a base material and rare earth elements such as yttrium (Yb), neodymium (Nd), cerium (Ce), praseodymium (Pr), and the like.

SUMMARY OF THE INVENTION

The radiation monitor performs measurement of a dose rate in an environment in which radiations with various amounts of energy and various irradiation directions are mixed, and thus improvement of accuracy of the measurement of a dose rate has been desired. This is because a measurement sensitivity of the radiation sensing unit varies depending on an amount of energy and an irradiation direction of the incident radiation. In general, it is considered that utilization of a metal shielding body which can attenuate an intensity of the radiation or reduction of a dependence on an amount of energy and an irradiation direction by a parallel arrangement of detectors for correction is effective. However, handleability deteriorates as the radiation sensing unit becomes larger and heavier, and complexity of a system is increased due to parallelization. Therefore, it is necessary to reduce a dependence on an amount of energy and an irradiation direction in a single small radiation sensing unit.

An object of the present invention is to provide a radiation monitor which includes phosphors emitting a photon with respect to an incident radiation and is capable of reducing a dependence of a sensitivity on an amount of energy and an irradiation direction.

An aspect of the present invention provides a radiation monitor including: a radiation sensing unit which includes phosphors emitting a photon with respect to an incident radiation; and a photon sending unit which sends the photon emitted from the phosphors of the radiation sensing unit, wherein the phosphors form a multilayer structure including a first phosphor and a second phosphor, and a photon absorbing layer absorbing a photon emitted from a phosphor is provided between the first phosphor and the second phosphor. Other aspects of the present invention will be described in embodiments to be described later.

According to the present invention, it is possible to reduce a dependence of a sensitivity of a radiation monitor including phosphors which emit a photon with respect to an incident radiation, on an amount of energy and an irradiation direction.

DESCRIPTION OF THE PREFERRED EMBODIMENTS

Embodiments of the present invention will be described in detail with reference to appropriate drawings.

In the present specification, a "counting rate of electric pulse signals" means the number of electric pulse signals measured per unit time. Further, in the present specification, a "predetermined specification range" refers to a range of a photon counting rate, and represents a range set for each specification. In the present specification, a "wavelength within a predetermined range" refers to a transmittable wavelength range, and a photon is controlled by transmitting only a photon with a certain wavelength. Further, in the present specification, a "single photon" refers to each photon generated inside a phosphor by incidence of a radiation. In addition, "piled-up electric pulse signals" refer to electric pulse signals generated when a plurality of single photons are simultaneously detected.

First Embodiment

Figure 1:
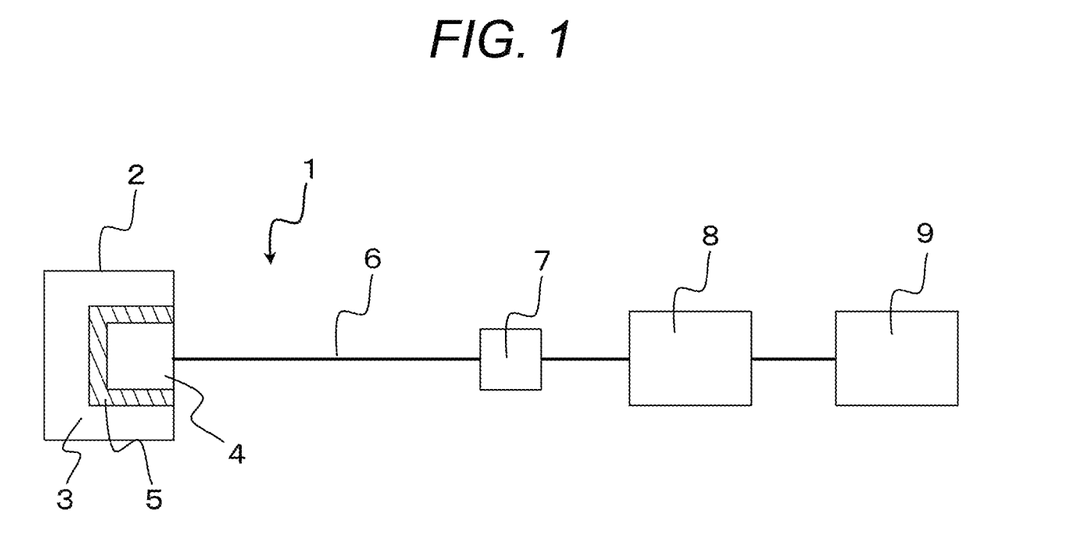
FIG. 1 is a block diagram showing a radiation monitor according to a first embodiment.

FIG. 1 is a block diagram showing a radiation monitor 1 according to a first embodiment. The radiation monitor 1 largely includes a radiation sensing unit 2, a photon sending unit 6, a photodetector 7, a counter 8, and an interpretation and display device 9 as shown in FIG. 1. Examples of a radiation which can be measured by the radiation monitor 1 include electromagnetic waves such as X-rays and γ-rays, and particle beams such as α-rays, β-rays, and neutron rays.

The radiation sensing unit 2 is an element including a first phosphor 3 which emits light with an intensity corresponding to a dose rate of an incident radiation, a second phosphor 4, and a photon absorbing layer 5 which absorbs a photon emitted from a phosphor.

It is preferable that the radiation sensing unit 2 is shielded by a housing in order to distinguish light from the outside, and light from the first phosphor 3 and the second phosphor 4 from each other. The housing is a container for accommodating the radiation sensing unit. A material for forming the housing is not particularly limited as long as a radiation to be measured can be transmitted through the material. For example, aluminum, a stainless steel, or the like can be adopted. That is, in the radiation monitor 1 according to the present embodiment, the radiation sensing unit (for example, the first phosphor 3, the second phosphor 4, and the photon absorbing layer 5) is accommodated in the housing.

The first phosphor 3 and the second phosphor 4 form a multilayer structure. The number of first phosphors 3 and the number of second phosphors 4 are not particularly limited, and two or more phosphors can also be stacked as long as the phosphors form a multilayer structure.

The first phosphor 3 and the second phosphor 4 are not particularly limited as long as they are compositions which show luminescence. Examples of the luminescence include luminescence by light such as ultraviolet rays, radio-luminescence by a radiation, cathode-luminescence by electron beams, electroluminescence by an electric field, chemical luminescence by a chemical reaction, and the like. In detail, the first phosphor 3 and the second phosphor 4 is formed of, for example, a light transmitting material such as NaI, CsI, LiI, $SrI_2$, $Bi_4Ge_3O_{12}$, $Bi_4Si_3O_{12}$, $CdWO_4$, $PbWO_4$, ZnS, $CaF_2$, LuAG, LuAP, $Lu_2O_3$, $Y_3Al_5O_{12}$, $YAlO_3$, $Lu_2SiO_5$, LYSO, $Y_2SiO_5$, $Gd_2SiO_5$, $BaF_2$, $CeF_3$, $CeBr_3$, CsF, LiF, $Gd_2O_2S$, $LaBr_3$, $CeBr_3$, $Gd_3Al_2Ga_3O_{12}$, $Cs_2LiYCl_6$, $ScTaO_4$, $LaTaO_4$, $LuTaO_4$, $GdTaO_4$, or $YTaO_4$ as a base material, or a light transmitting material in which a rare earth element such as La, Ce, Pr, Nd, Sm, Eu, Gd, Tb, Dy, Ho, Er, Tm, Yb, Lu, or Y, an element such as Tl, Na, Ag, W, or $CO_3$, or fluorescent material powder is contained in the light transmitting material as the base material. In addition, a valence of an element ion contained in the first phosphor 3 and the second phosphor 4 is not particularly limited as long as it can be used for light emission. For example, a monovalent element ion, a divalent element ion, a trivalent element ion, or a tetravalent element ion can be used.

A method of producing the first phosphor 3 and the second phosphor 4 is not particularly limited as long as a composition which shows luminescence can be grown. For example, a floating-zone method, a Czochralski method (pulling method), a micro-pulling-down method, a Bridgman method, a Verneuil method, or the like can be used.

It is preferable that the photon absorbing layer 5 is interposed between the first phosphor 3 and the second phosphor 4. By doing so, the photon generated from the first phosphor 3 can be attenuated in the photon absorbing layer 5 and sent to the photon sending unit 6.

The photon absorbing layer 5 is not particularly limited as long as the photon generated inside the radiation sensing unit 2 can be absorbed. For example, an optical film, an optical filter, a thin film, a multilayer film, a phosphor, grease, powder, paint, air, or the like can be used. In addition, surface states of the first phosphor 3 and the second phosphor 4 can be used as the photon absorbing layer 5. For example, an inner side surface of the first phosphor 3 and an outer side surface of the second phosphor 4 can be machined. Examples of a surface machining method that can be adopted include a mechanical machining by polishing or the like, a film treatment by plating or coating, a heat treatment, a chemical treatment, a painting treatment, and the like.

It is preferable that a shape formed by the first phosphor 3, the photon absorbing layer 5, and the second phosphor 4 has a multilayer nested structure. By doing so, it is possible to reduce a dependence of sensitivity on an amount of energy and an irradiation direction.

The shape formed by the first phosphor 3, the photon absorbing layer 5, and the second phosphor 4 is not particularly limited as long as it has the multilayer nested structure. For example, the shape formed by the first phosphor 3, the photon absorbing layer 5, and the second phosphor 4 can be a cylindrical shape (see FIG. 9A), a prism shape (see FIG. 9B), a hemispherical shape (see FIG. 9C), and the like. The cylindrical shape is excellent in terms of convenience in growing a phosphor and machining. The prism shape is excellent in terms of convenience in machining. The hemispherical shape is excellent in terms of the fact that it is possible to improve accuracy of measurement of a dose rate of radiation as a measurement target.

The photon sending unit 6 is connected to the second phosphor 4 and sends light emitted from the radiation sensing unit 2. The photon sending unit 6 is connected to the second phosphor 4 and the photodetector 7 to be described later. The photon sending unit 6 is not particularly limited as long as the photon can be sent. For example, an optical fiber, an optical guide, an optical pipe, or the like can be adopted. In addition, examples of a material of the photon sending unit 6 include quartz, plastics, and the like.

The photodetector 7 is a detector which is connected to the photon sending unit 6 and converts the photon sent from the photon sending unit 6 into an electric pulse signal. The photodetector 7 is connected to the photon sending unit 6 and the counter 8 to be described later. As the photodetector 7, for example, a photomultiplier tube, an avalanche photodiode, or the like can be adopted. By using the photomultiplier tube or the like, it is possible to detect a single photon as a current-amplified electric pulse signal.

The counter 8 is a device which is connected to the photodetector 7 and counts the electric pulse signal input from the photodetector 7. The counter 8 is connected to the photodetector 7 and the interpretation and display device 9 to be described later. As the counter 8, for example, a digital signal processor or the like can be adopted.

The interpretation and display device 9 is a device which is connected to the counter 8, converts a counting rate of the electric pulse signals counted by the counter 8 into a radiation dose rate, and displays the radiation dose rate. The interpretation and display device 9 includes a storage device including a database of associating a counting rate of electric pulse signals and a radiation dose rate, an arithmetic operation device converting the counting rate of the electric pulse signals into the radiation dose rate by using the database, and a display device displaying the converted radiation dose rate. As the interpretation and display device 9, for example, a personal computer having the above described functions, or the like can be adopted.

Unlike a conventional method of converting a counting rate of γ-rays into a radiation dose rate, according to the present invention, a counting rate of single photons among a plurality of photons generated from the first phosphor 3 and the second phosphor 4 by incidence of γ-rays is converted into a radiation dose rate.

Figure 2:
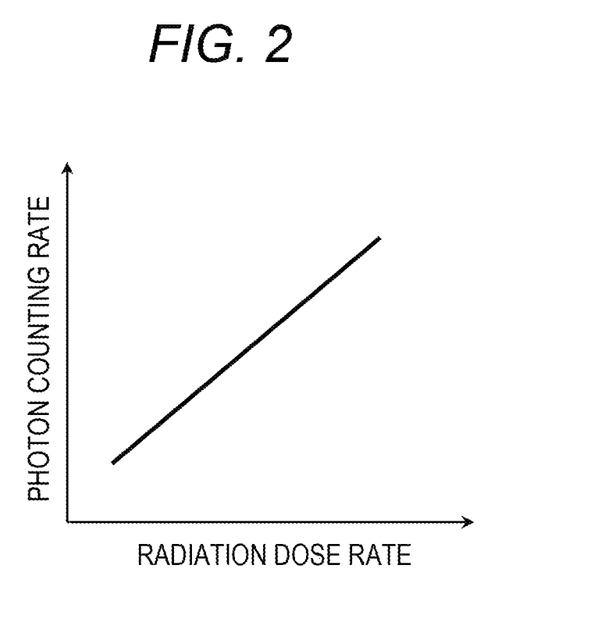
FIG. 2 is a schematic diagram showing an example of a relation between a radiation dose rate and a single photon counting rate.

FIG. 2 is a schematic diagram showing an example of a relation between a radiation dose rate and a single photon counting rate. As shown in FIG. 2, when a single photon counting rate can be measured, it is possible to acquire a radiation dose rate. Accordingly, it is possible to convert the calculated single photon counting rate into a radiation dose rate by using the relation.

Next, an operation of the corresponding radiation monitor 1 will be described.

Figure 3:
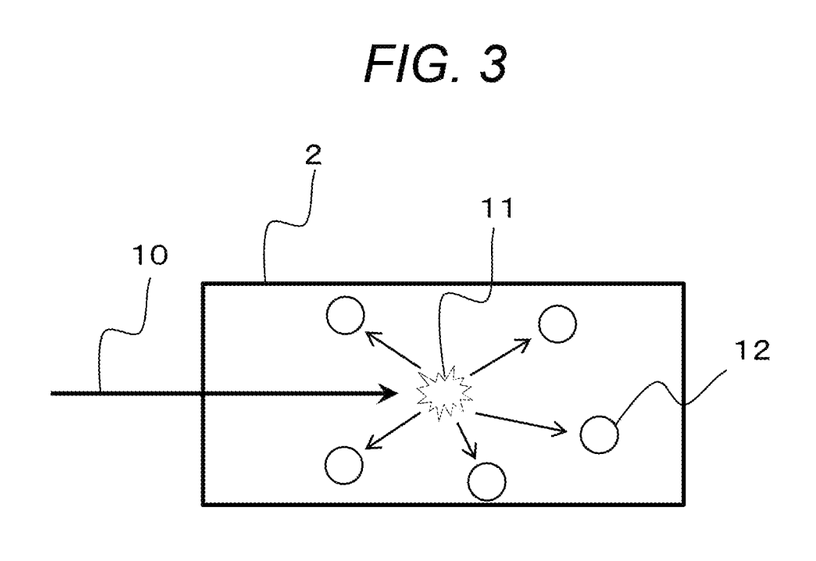
FIG. 3 is a schematic diagram showing an example of generation of light when a radiation is incident on a phosphor.

FIG. 3 is a schematic diagram showing an example of generation of light when a radiation 10 is incident on the radiation sensing unit 2. As shown in FIG. 3, when the radiation 10 is incident on the radiation sensing unit 2, an interaction 11 occurs. As the interaction 11 occurs, a plurality of single photons 12 are generated.

Figure 4:
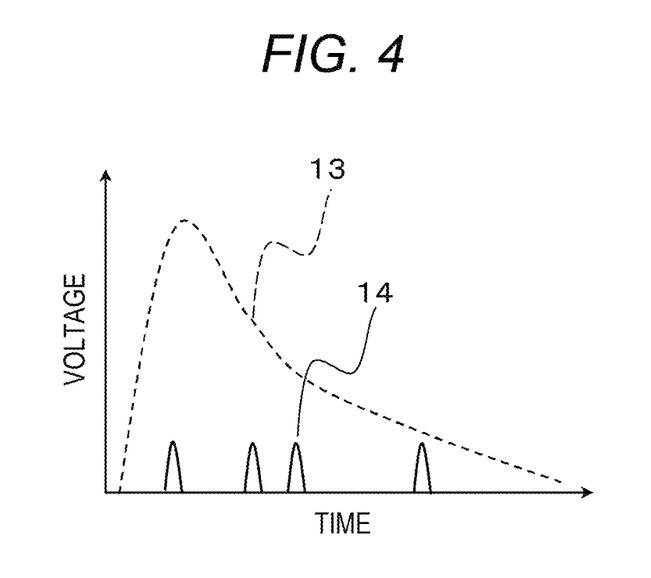
FIG. 4 is a schematic diagram showing an example of an electric pulse signal when it is assumed that an output of a photodetector is measured.

FIG. 4 is a schematic diagram showing an example of an electric pulse signal 14 when it is assumed that an output of the photodetector 7 is measured. In general, when one radiation 10 is incident on the radiation sensing unit 2, the plurality of single photons 12 are generated and each of the plurality of single photons 12 is measured as one electric pulse signal 13 by using the photodetector 7. Meanwhile, in the present embodiment, each single photon 12 sent from the photon sending unit 6 is measured by the photodetector 7. As shown in FIG. 4, the single photon 12 is measured as an electric pulse signal 14 with a time width of about 2 ns by the photodetector 7.

Figure 5:
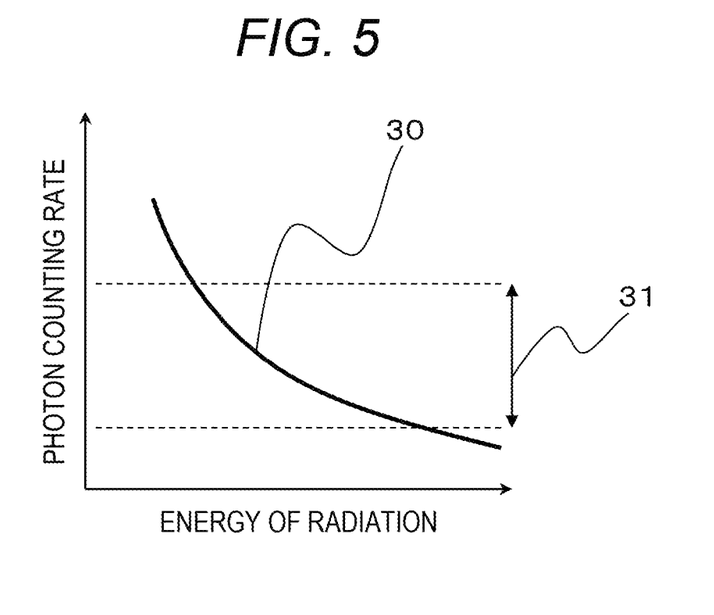
FIG. 5 is a schematic diagram showing an example of a dependence of a photon counting rate on an amount of energy.

FIG. 5 is a schematic diagram showing an example of a dependence of a photon counting rate on an amount of energy. As shown in FIG. 5, a counting rate 30 of photons detected by the photodetector 7 (see FIG. 1) is changed depending on an amount of energy of an incident radiation. In general, as the amount of energy of the radiation is decreased, the counting rate 30 of the photons is increased, and as the amount of energy of the radiation is increased, the counting rate 30 of the photons is decreased. This is because a measurement sensitivity of the phosphor included in the radiation sensing unit 2 varies depending on the amount of energy of the incident radiation. In particular, when a phosphor with high density is applied to the radiation sensing unit 2, such a dependence becomes significant. For example, when a phosphor with a density of 8 g/cm$^3$ or more is used, a counting rate 30 of the photon with respect to γ-rays of 1250 keV is 15 times or more the counting rate 30 of the photon with respect to X-rays of 80 keV. The radiation monitor performs measurement of a dose rate in an environment in which radiations with various amounts of energy and various irradiation directions are mixed. Therefore, it is necessary to reduce the sensitivity of the radiation sensing unit 2 (see FIG. 1) so that a measured photon counting rate is within a predetermined specification range 31 with respect to various amounts of energy of the radiations.

Figure 6:
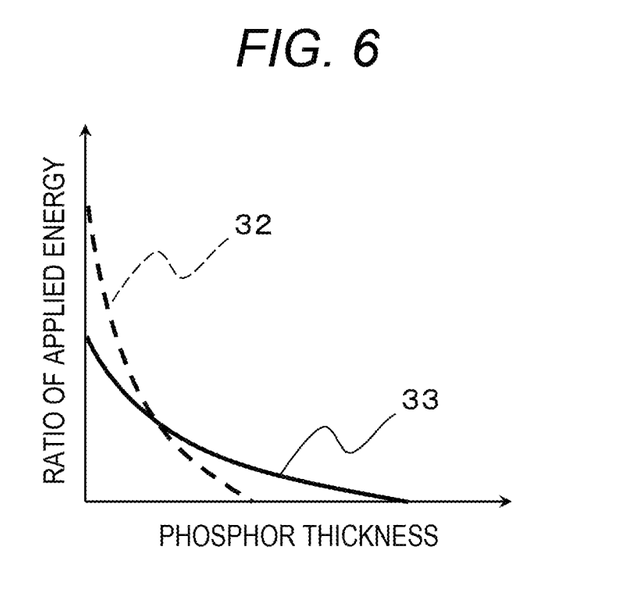
FIG. 6 is a schematic diagram showing an example of a dependence of a ratio of an applied energy on a thickness of a phosphor.

FIG. 6 is a schematic diagram showing an example of a dependence of a ratio of an applied energy on a thickness of a phosphor. As shown in FIG. 6, a low energy radiation 32 has a low transmittance, and thus energy is mainly applied to a surface of the phosphor with respect to a radiation incidence surface. Meanwhile, a high energy radiation 33 has a high transmittance, and thus energy is applied deeply into the phosphor in a thickness direction, in comparison to the low energy radiation 32. For example, when a phosphor with a density of 8 g/cm$^3$ or more is used, 100% of energy is applied while X-rays of 80 keV are transmitted through a thickness of 0.6 mm. Whereas, 100% of the energy is applied while γ-rays of 1250 keV are transmitted through a thickness of 1.5 mm or more.

Figure 7:
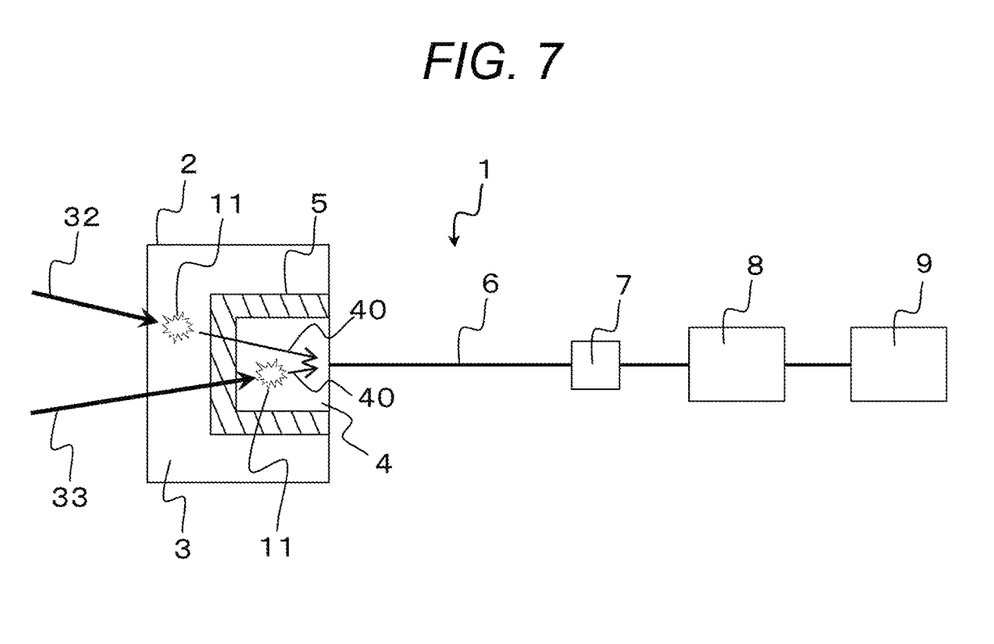
FIG. 7 is a schematic diagram showing an example of generation of light when a radiation is incident on a first phosphor and a second phosphor.

FIG. 7 is a schematic diagram showing an example of generation of light when a radiation is incident on the first phosphor and the second phosphor. As shown in FIG. 7, when the low energy radiation 32 is incident on the radiation sensing unit 2, the interaction 11 occurs in the first phosphor 3, and a generated photon 40 is sent to the photon sending unit 6 by being transmitted through the photon absorbing layer 5. In addition, when the high energy radiation 33 is incident on the radiation sensing unit 2, the interaction 11 occurs in the second phosphor 4, and a generated photon 40 is sent to the photon sending unit 6. As described above, in the case of the low energy radiation 32 by which a counting rate of photons detected by the photodetector 7 is increased, the generated photon 40 is transmitted through the photon absorbing layer 5, such that it is possible to reduce a dependence of the sensitivity of the radiation sensing unit 2 on an amount of energy. In addition, as described above, the first phosphor 3, the photon absorbing layer 5, and the second phosphor 4 form a multilayer nested structure, such that it is possible to reduce a dependence of the sensitivity of the radiation sensing unit 2 on an irradiation direction.

Figure 8:
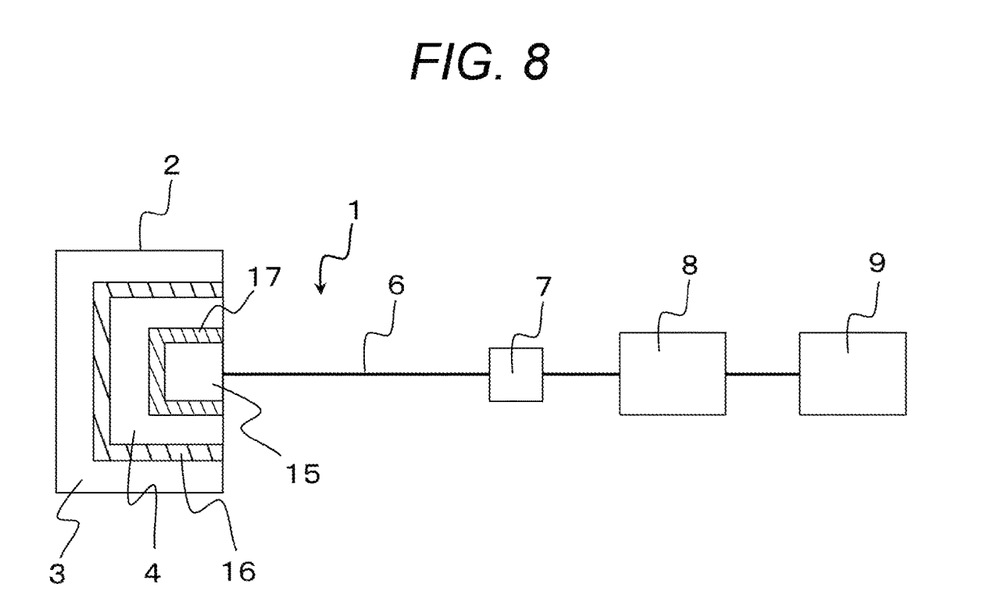
FIG. 8 is a schematic diagram showing another example of a structure of the radiation sensing unit.

FIG. 8 is a schematic diagram showing another example of a structure of the radiation sensing unit. As shown in FIG.

8, the radiation sensing unit 2 includes a third phosphor 15, and a first photon absorbing layer 16 and a second photon absorbing layer 17 are each disposed between respective phosphors having a nested structure. As described above, the radiation sensing unit 2 includes a plurality of phosphors and photon absorbing layers having a nested structure, such that it is possible to improve accuracy of measurement of a radiation dose rate.

Figure 9A:
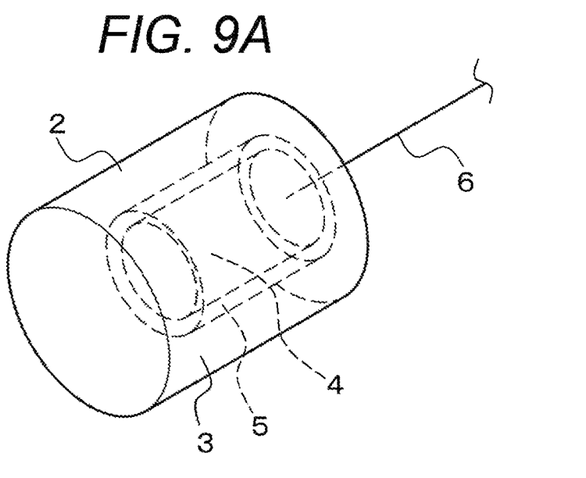
FIG. 9A is a schematic perspective diagram showing a cylindrical structure of the radiation sensing unit.

FIG. 9A is a schematic perspective diagram showing a cylindrical structure of the radiation sensing unit. As shown in FIG. 9A, in the radiation sensing unit 2, the first phosphor 3 and the second phosphor 4 each have a cylindrical shape and the photon absorbing layer 5 is disposed between the first phosphor 3 and the second phosphor 4. As described above, the second phosphor 4 and the photon absorbing layer 5 each have a cylindrical shape, such that it is possible to improve accuracy of measurement of a radiation dose rate.

Figure 9B:
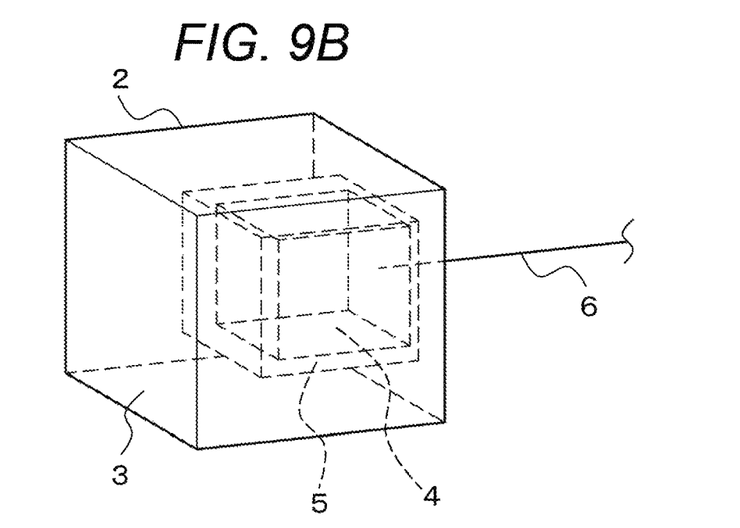
FIG. 9B is a schematic perspective diagram showing a prism structure of the radiation sensing unit.

FIG. 9B is a schematic perspective diagram showing a prism structure of the radiation sensing unit. As shown in FIG. 9B, in the radiation sensing unit 2, the first phosphor 3 and the second phosphor 4 each have a prism shape and the photon absorbing layer 5 is disposed between the first phosphor 3 and the second phosphor 4. As described above, the first phosphor 3 and the second phosphor 4 each have a prism shape, such that it is possible to improve accuracy of measurement of a radiation dose rate.

Figure 9C:
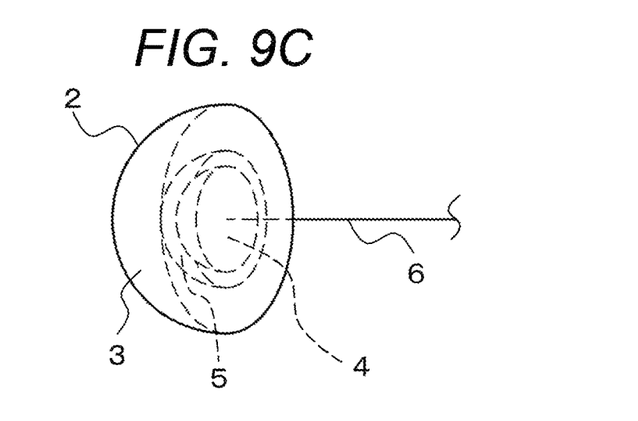
FIG. 9C is a schematic perspective diagram showing a hemispherical structure of the radiation sensing unit.

FIG. 9C is a schematic perspective diagram showing a hemispherical structure of the radiation sensing unit. As shown in FIG. 9C, in the radiation sensing unit 2, the first phosphor 3 and the second phosphor 4 each have a hemispherical shape and the photon absorbing layer 5 is disposed between the first phosphor 3 and the second phosphor 4. As described above, the second phosphor 4 and the photon absorbing layer 5 each have a hemispherical shape, such that it is possible to improve accuracy of measurement of a radiation dose rate.

As described above, the corresponding radiation monitor 1 includes the first phosphor 3, the second phosphor 4, and the photon absorbing layer 5, such that it is possible to reduce the sensitivity with respect to various amounts of energy and irradiation directions of radiations, and improve accuracy of measurement of a dose rate.

Next, an appropriate usage example of the corresponding radiation monitor 1 will be described.

Figure 10:
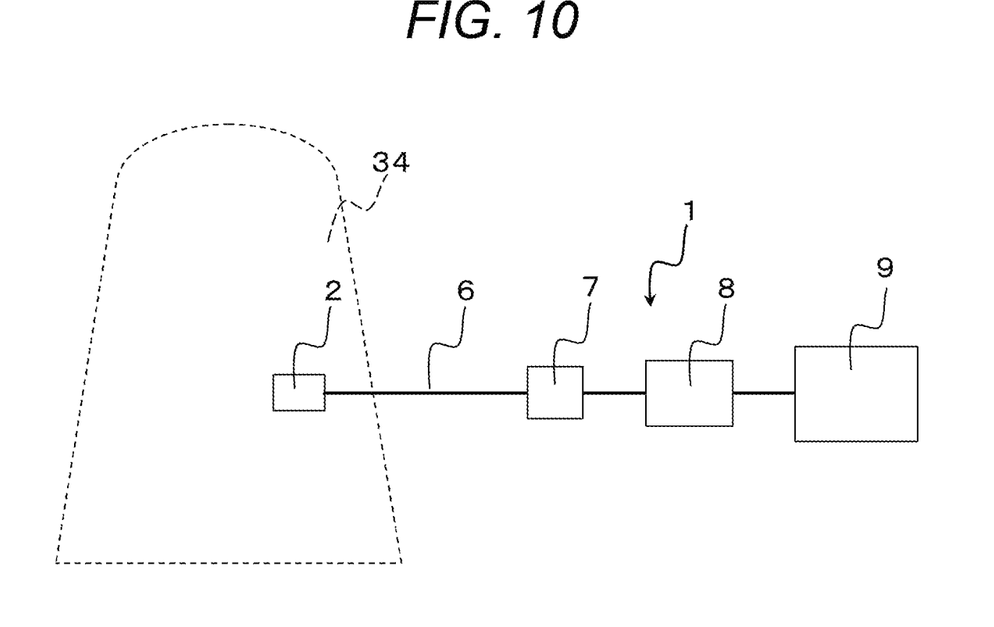
FIG. 10 is a schematic diagram illustrating a usage example of the radiation monitor in FIG. 1.

FIG. 10 is a schematic diagram illustrating a usage example of the radiation monitor in FIG. 1. As shown in FIG. 10, the radiation sensing unit 2 is installed within a measurement target area 34, and the photodetector 7 connected to the photon sending unit 6, the counter 8, and the interpretation and display device 9 are installed outside the measurement target area 34. As a result, it is possible to measure a dose rate with respect to various amounts of energy and various irradiation directions of radiations inside, for example, a nuclear reactor building or a nuclear reactor containment vessel with high accuracy.

Figure 11:
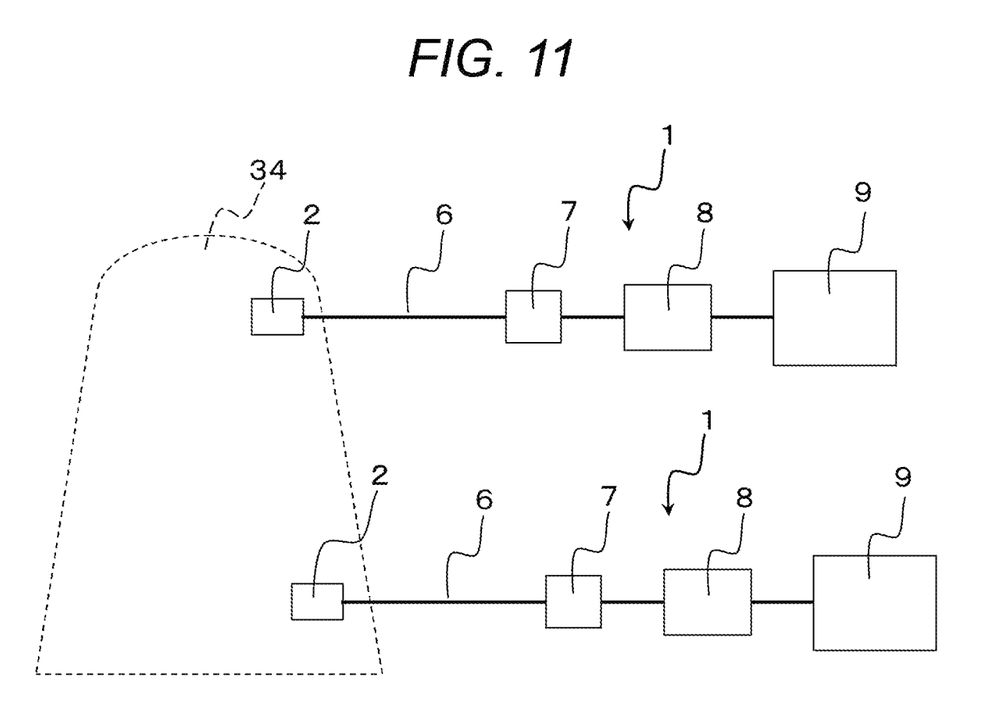
FIG. 11 is a schematic diagram illustrating another usage example of the radiation monitor in FIG. 1.

FIG. 11 is a schematic diagram illustrating another usage example of the radiation monitor in FIG. 1. As shown in FIG. 11, at least two or more radiation sensing units 2 are installed inside the measurement target area 34, such that it is possible to measure distribution of dose rates in the measurement target area 34 with high accuracy. For the effects described above, the corresponding radiation monitor 1 can be applied to a nuclear power plant, a nuclear fuel reprocessing facility, or a medical facility, an industrial facility, a research accelerator facility, a general environment monitoring apparatus, or the like, in which a radioactive isotope is used.

Second Embodiment

A radiation monitor 1 according to a second embodiment of the present invention will be described with reference to FIG. 12. In the following embodiment which is an alternative for the first embodiment, the same reference numeral denotes the same component, and only a difference from the first embodiment will be described. Therefore, a portion which is not described is the same as that of the first embodiment.

Figure 12:
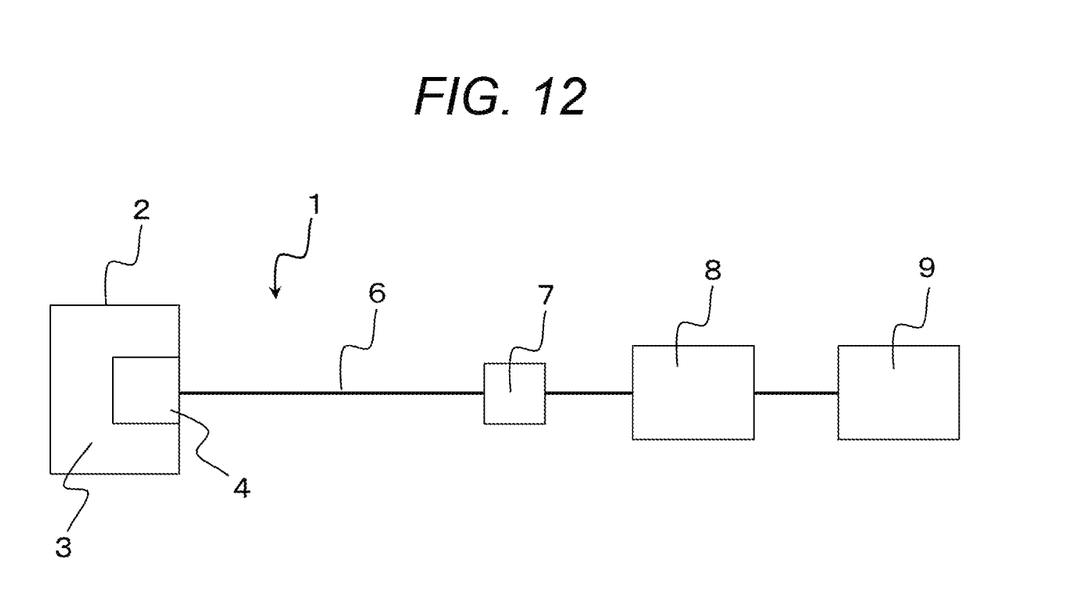
FIG. 12 is a schematic block diagram showing a radiation monitor according to a second embodiment.

FIG. 12 is a schematic block diagram showing a radiation monitor 1 according to a second embodiment. In the schematic block diagram showing the second embodiment, a photon absorbing layer 5 is not provided, which is different from the first embodiment. It should be noted that a radiation sensing unit 2, a first phosphor 3, a second phosphor 4, a photon sending unit 6, a photodetector 7, a counter 8, and an interpretation and display device 9 are the same as those of the first embodiment, and thus a detailed description thereof will be omitted.

The radiation sensing unit 2 is an element including a first phosphor 3 which emits light with an intensity corresponding to a dose rate of an incident radiation, and a second phosphor 4.

The first phosphor 3 and the second phosphor 4 form a multilayer nested structure. The number of first phosphors 3 and the number of second phosphors 4 are not particularly limited, and two or more phosphors can also be stacked as long as the phosphors form a multilayer structure.

Characteristics of the first phosphor 3 and the second phosphor 4 are not particularly limited as long as the first phosphor 3 and the second phosphor 4 form the multilayer nested structure. For example, phosphor with different transmittances or densities can be used. As phosphors with different transmittances are used as the first phosphor 3 and the second phosphor 4, it is possible to reduce a dependence of sensitivity of the radiation sensing unit 2 on an irradiation direction. In addition, as phosphors with different densities are used as the first phosphor 3 and the second phosphor 4, it is possible to reduce a dependence of sensitivity of the radiation sensing unit 2 on an irradiation direction.

According to the present embodiment, in the corresponding radiation monitor 1, the first phosphor 3 and the second phosphor 4 form a multilayer nested structure, and the first phosphor 3 and the second phosphor 4 have different characteristics, such that it is possible to easily manufacture the radiation sensing unit 2. In addition, it is possible to reduce the sensitivity with respect to various amounts of energy and irradiation directions of radiations, and improve accuracy of measurement of a dose rate.

Third Embodiment

A radiation monitor 1 according to a third embodiment of the present invention will be described with reference to FIG. 13. In the following embodiment which is an alternative for the first and second embodiments, the same reference numeral denotes the same component, and only a difference from the first and second embodiments will be described. Therefore, a portion which is not described is the same as those of the first and second embodiments.

Figure 13:
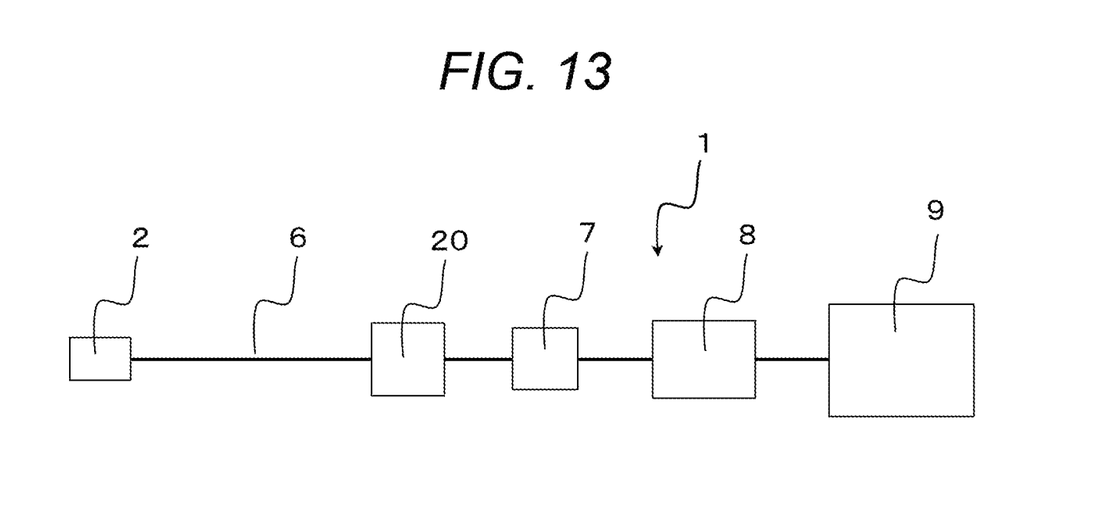
FIG. 13 is a schematic block diagram showing a radiation monitor according to a third embodiment.

FIG. 13 is a schematic block diagram showing a radiation monitor 1 according to a third embodiment. FIG. 1 is appropriately referred to. In the schematic block diagram showing the third embodiment, an optical filter 20 is provided, which is different from the first and second embodiments. It should be noted that a radiation sensing unit 2, a first phosphor 3, a second phosphor 4, a photon absorbing layer 5, a photon sending unit 6, a photodetector 7, a counter 8, and an interpretation and display device 9 are the same as those of the first embodiment, and thus a detailed description thereof will be omitted.

The optical filter 20 is a device which is connected to the photon sending unit 6 and the photodetector 7, and attenuates the number of photons sent from the photon sending unit 6 or transmits a wavelength within a predetermined range. As described above, as the corresponding radiation monitor 1 has the function of attenuating the number of photons by the optical filter 20, it is possible to suppress single photons from being piled up, thereby expanding a dynamic range of measurement. In addition, as the corresponding radiation monitor 1 has the function of transmitting the wavelength in the predetermined range by the optical filter 20, it is possible to exclude a wavelength of light emission other than light emission from the radiation sensing unit 2 including the first phosphor 3 and the second phosphor 4, thereby improving accuracy of measurement of a dose rate. As the optical filter 20, for example, a wavelength filter, an attenuating filter, or the like can be adopted. The wavelength filter is a filter capable of transmitting only a photon within a preset wavelength range. The attenuation filter is a filter attenuating the number of photons of light at a preset probability. In addition, it is also possible to use by combining two or more optical filters.

According to the present embodiment, as the corresponding radiation monitor 1 has the function of attenuating the number of photons by the optical filter 20, it is possible to suppress single photons from being piled up, thereby expanding a dynamic range of measurement. In addition, as the corresponding radiation monitor 1 has the function of transmitting the wavelength in the predetermined range by the optical filter 20, it is possible to exclude a wavelength of light emission other than light emission from the radiation sensing unit 2 including the first phosphor 3 and the second phosphor 4, thereby improving accuracy of measurement of a dose rate.

Fourth Embodiment

A radiation monitor 1 according to a fourth embodiment of the present invention will be described with reference to FIG. 14. In the following embodiment which is an alternative for the first to third embodiments, the same reference numeral denotes the same component, and only a difference from the first to third embodiments will be described. Therefore, a portion which is not described is the same as those of the first to third embodiments.

Figure 14:
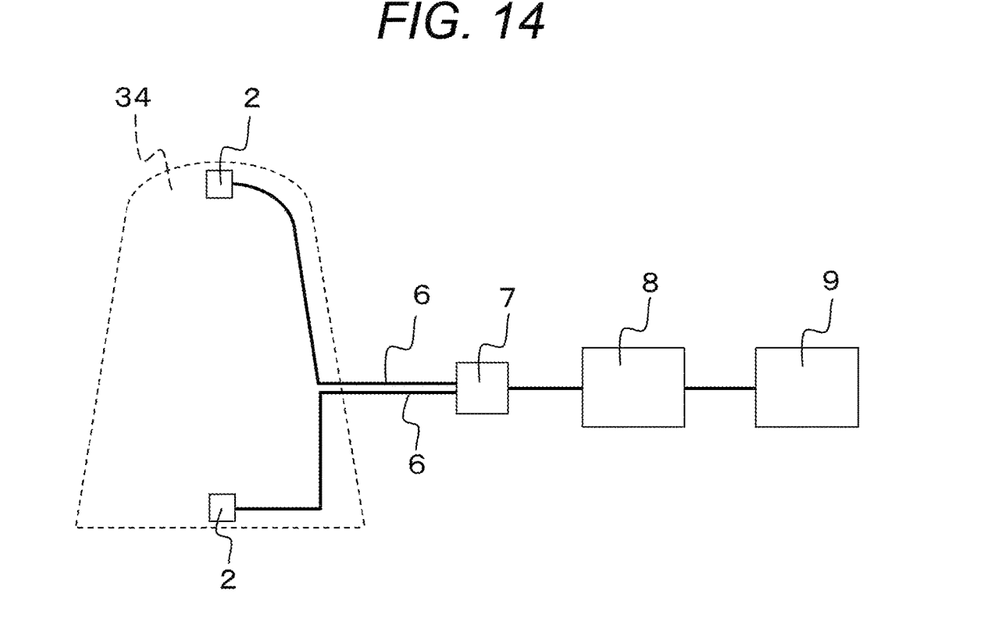
FIG. 14 is a schematic block diagram showing a radiation monitor according to a fourth embodiment.

FIG. 14 is a schematic block diagram showing a radiation monitor 1 according to a fourth embodiment. FIGS. 1 and 10 are appropriately referred to. In the schematic block diagram showing the fourth embodiment, the radiation monitor 1 includes at least two or more radiation sensing units 2, and at least two or more photon sending units 6 are connected to the same photodetector 7, which is different from the first to third embodiments. It should be noted that the radiation sensing unit 2, a first phosphor 3, a second phosphor 4, a photon absorbing layer 5, the photon sending unit 6, a counter 8, an interpretation and display device 9, and a measurement target area 34 are the same as those of the first embodiment, and thus a detailed description thereof will be omitted.

In the case of the corresponding radiation monitor 1 according to the present embodiment, the numbers of photodetectors 7, the counters 8, the interpretation and display devices 9 is decreased, such that a size of the radiation monitor 1 is decreased, thereby saving an installation space, decreasing introduction and operation costs, decreasing the number of inspected products and processes at the time of maintenance, and reducing erratic accuracy of measurement of a dose rate due to an influence of an individual difference of the photodetector 7.

As the photodetector 7, for example, a position detection type photomultiplier tube, an avalanche photodiode, or the like can be adopted. By doing so, it is possible to distinguish and measure each dose rate of two or more radiation sensing units from photon detection position information from the photodetector 7.

Fifth Embodiment

A radiation monitor 1 according to a fifth embodiment of the present invention will be described with reference to FIG. 15. In the following embodiment which is an alternative for the fourth embodiment, the same reference numeral denotes the same component, and only a difference from the fourth embodiment will be described. Therefore, a portion which is not described is the same as those of the fourth embodiment.

Figure 15:
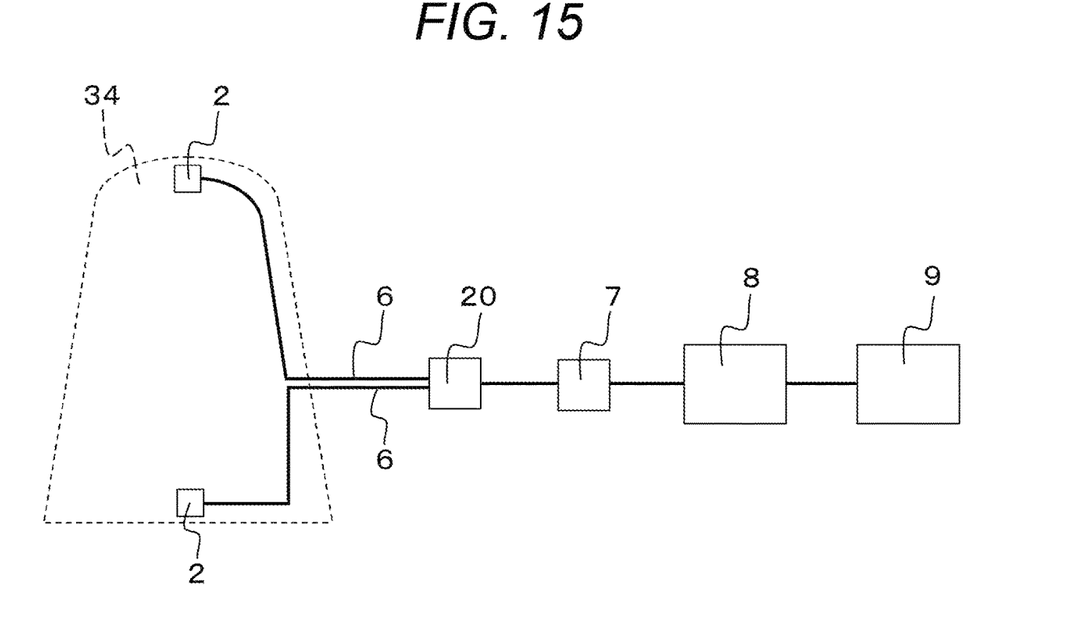
FIG. 15 is a schematic block diagram showing a radiation monitor according to a fifth embodiment.

FIG. 15 is a schematic block diagram showing a radiation monitor 1 according to a fifth embodiment. FIGS. 1, 10, and 14 are appropriately referred to. In the schematic block diagram showing the fifth embodiment, an optical filter 20 is further provided, which is different from the fourth embodiment. It should be noted that a radiation sensing unit 2, a first phosphor 3, a second phosphor 4, a photon absorbing layer 5, a photon sending unit 6, a photodetector 7, a counter 8, an interpretation and display device 9, and a measurement target area 34 are the same as those of the fourth embodiment, and thus a detailed description thereof will be omitted.

At least two or more photon sending units 6 are connected to the same optical filter 20, and the optical filter 20 is a device which attenuates the number of photons sent from the photon sending unit 6 or transmits a wavelength within a predetermined range.

According to the present embodiment, as the corresponding radiation monitor 1 has the function of attenuating the number of photons by the optical filter 20, it is possible to suppress single photons from being piled up, thereby expanding a dynamic range of measurement. In addition, as the corresponding radiation monitor 1 has the function of transmitting the wavelength in the predetermined range by the optical filter 20, it is possible to exclude a wavelength of light emission other than light emission from the radiation sensing unit 2 including the first phosphor 3 and the second phosphor 4, thereby improving accuracy of measurement of a dose rate.

Sixth Embodiment

A radiation monitor 1 according to a sixth embodiment of the present invention will be described with reference to FIG. 16. In the following embodiment which is an alternative for the fourth embodiment, the same reference numeral denotes the same component, and only a difference from the fourth embodiment will be described. Therefore, a portion which is not described is the same as those of the fourth embodiment.

Figure 16:
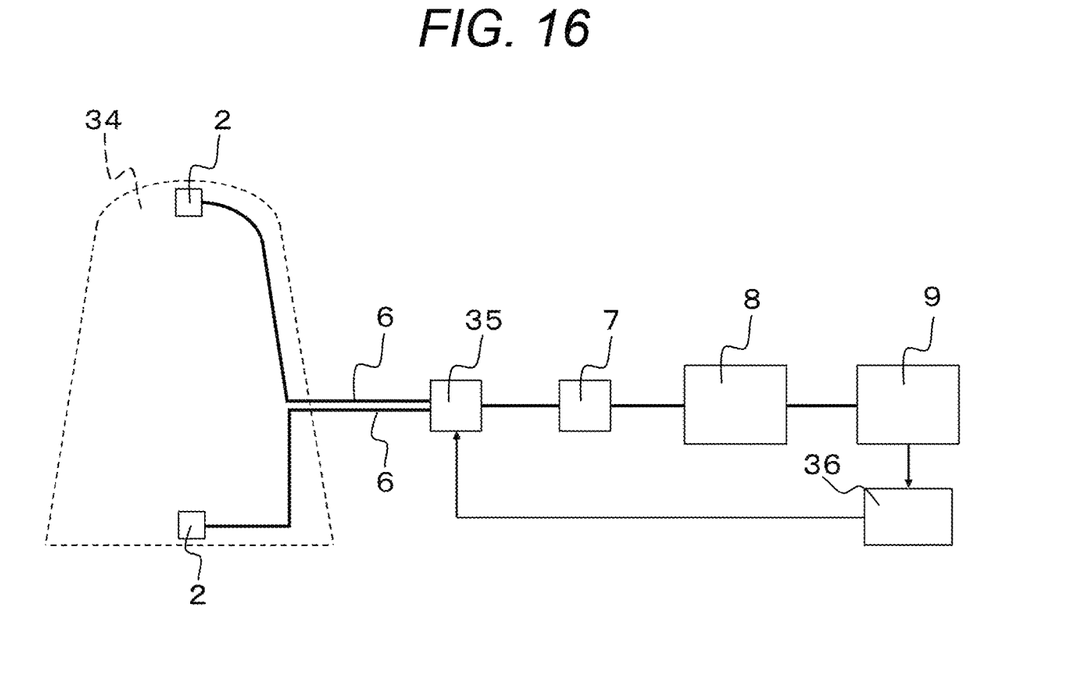
FIG. 16 is a schematic block diagram showing a radiation monitor according to a sixth embodiment.

FIG. 16 is a schematic block diagram showing a radiation monitor 1 according to a sixth embodiment. In the schematic block diagram showing the sixth embodiment, a light selection unit 35 selecting a photon sent from a photon sending unit 6 and a control unit 36 controlling the light selection unit 35 and disposed between an interpretation and display device 9 and the light selection unit 35 are further provided, which is different from the fourth embodiment. It should be noted that a radiation sensing unit 2, a first phosphor 3, a second phosphor 4, a photon absorbing layer 5, the photon sending unit 6, a photodetector 7, a counter 8, the interpretation and display device 9, and a measurement target area 34 are the same as those of the fourth embodiment, and thus a detailed description thereof will be omitted.

The light selection unit 35 is a mechanism which is operated by an output from the control unit 36 and selects the photon sending unit 6 (for example, a first optical fiber and a second optical fiber) connected to the light selection unit 35. The light selection unit 35 is not particularly limited as long as the photon sending unit 6 can be selected. For example, an optical switch, an optical coupler, an optical splitter, or the like can be adopted. It should be noted that it is also possible to select three or more photon sending units 6.

The control unit 36 is a device which is connected to the interpretation and display device 9 and the light selection unit 35 described above, determines whether or not measurement by the interpretation and display device 9 ends, and controls the light selection unit 35 according to a determination result. When the measurement by the interpretation and display device 9 ends, the control unit 36 drives the light selection unit 35 to select the photon sending unit 6. It should be noted that it is also possible to select three or more photon sending units 6.

In the case of the corresponding radiation monitor 1 according to the present embodiment, the numbers of photodetectors 7, the counters 8, the interpretation and display devices 9 are decreased, such that a size of the radiation monitor 1 is decreased, thereby saving an installation space, decreasing introduction and operation costs, decreasing the number of inspected products and processes at the time of maintenance, and reducing erratic accuracy of measurement of a dose rate due to an influence of an individual difference of the photodetector 7. In addition, it is possible to automate all measurements by using two or more radiation sensing units 2 thereby largely reducing efforts and a time for the measurement.

Seventh Embodiment

A radiation monitor 1 according to a seventh embodiment of the present invention will be described with reference to FIG. 17. In the following embodiment which is an alternative for the sixth embodiment, the same reference numeral denotes the same component, and only a difference from the sixth embodiment will be described. Therefore, a portion which is not described is the same as those of the sixth embodiment.

Figure 17:
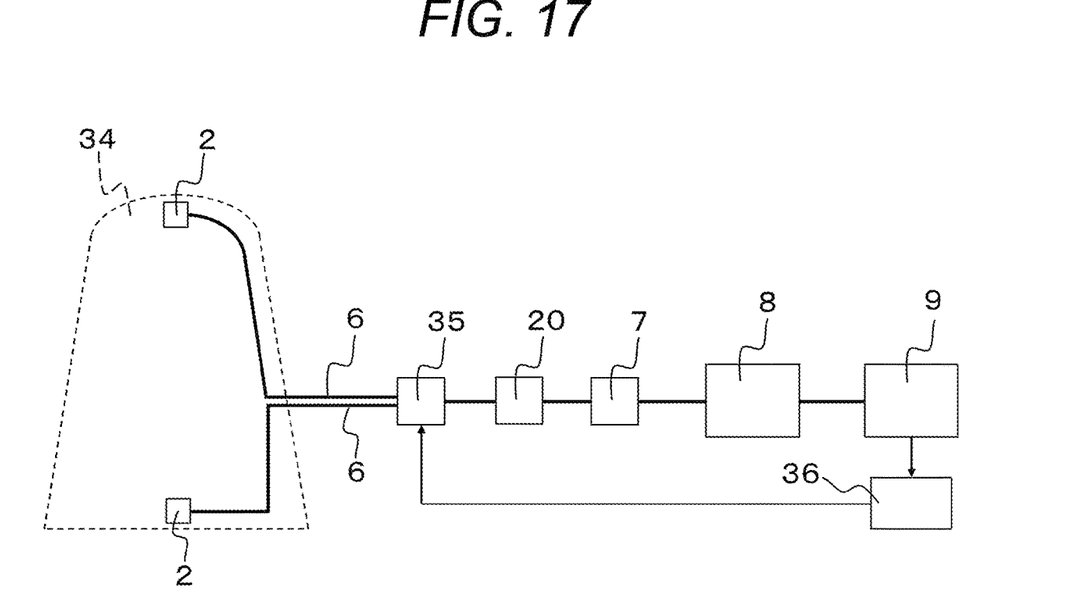
FIG. 17 is a schematic block diagram showing a radiation monitor according to a seventh embodiment.

FIG. 17 is a schematic block diagram showing a radiation monitor 1 according to a seventh embodiment. In the schematic block diagram showing the seventh embodiment, an optical filter 20 is provided, which is different from the sixth embodiment. It should be noted that a radiation sensing unit 2, a first phosphor 3, a second phosphor 4, a photon absorbing layer 5, a photon sending unit 6, a photodetector 7, a counter 8, an interpretation and display device 9, a measurement target area 34, a light selection unit 35, and a control unit 36 are the same as those of the sixth embodiment, and thus a detailed description thereof will be omitted.

The optical filter 20 is a device which is connected to the light selection unit 35 and attenuates the number of photons sent from the light selection unit 35 or transmits a wavelength within a predetermined range.

According to the present embodiment, as the corresponding radiation monitor 1 has the function of attenuating the number of photons by the optical filter 20, it is possible to suppress single photons from being piled up, thereby expanding a dynamic range of measurement. In addition, as the corresponding radiation monitor 1 has the function of transmitting the wavelength in the predetermined range by the optical filter 20, it is possible to exclude a wavelength of light emission other than light emission from the radiation sensing unit 2 including the first phosphor 3 and the second phosphor 4, thereby improving accuracy of measurement of a dose rate.

Eighth Embodiment

A radiation monitor 1 according to an eighth embodiment of the present invention will be described with reference to FIG. 18. In the following embodiment which is an alternative for the sixth embodiment, the same reference numeral denotes the same component, and only a difference from the sixth embodiment will be described. Therefore, a portion which is not described is the same as those of the sixth embodiment.

Figure 18:
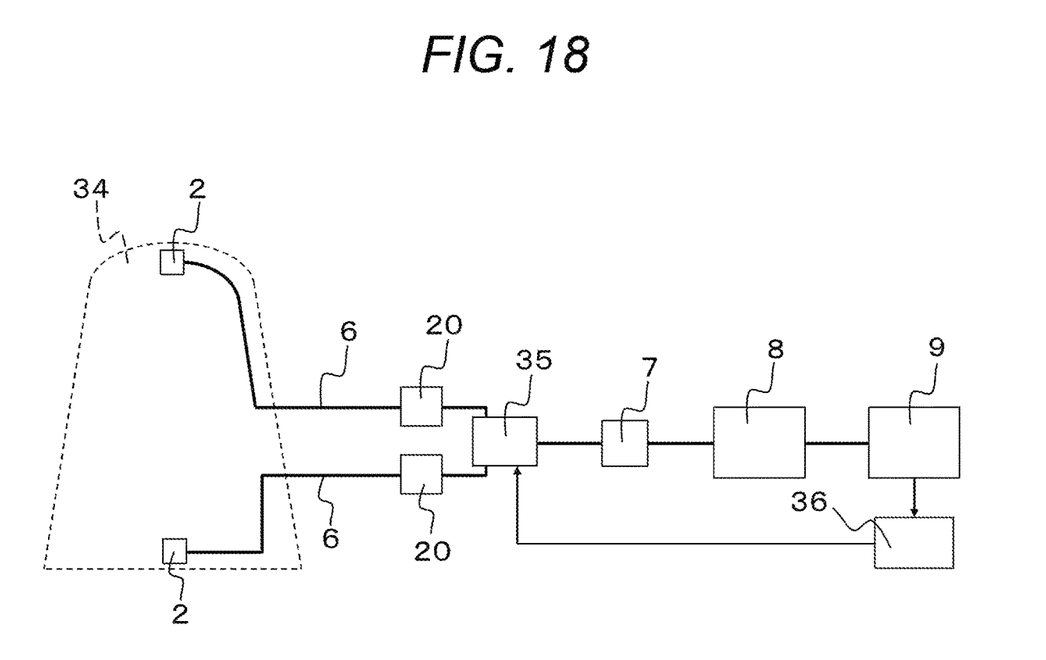
FIG. 18 is a schematic block diagram showing a radiation monitor according to an eighth embodiment.

FIG. 18 is a schematic block diagram showing a radiation monitor 1 according to an eighth embodiment. In the schematic block diagram showing the eighth embodiment, an optical filter 20 connected between each photon sensing unit 6 and the light selection unit 35 is further provided, which is different from the sixth embodiment. It should be noted that a radiation sensing unit 2, a first phosphor 3, a second phosphor 4, a photon absorbing layer 5, a photon sending unit 6, a photodetector 7, a counter 8, an interpretation and display device 9, a measurement target area 34, a light selection unit 35, and a control unit 36 are the same as those of the sixth embodiment, and thus a detailed description thereof will be omitted.

The optical filter 20 is a device which is connected between each photon sending unit 6 and the light selection unit 35, and attenuates the number of photons sent from the photon sending unit 6 or transmits a wavelength within a predetermined range. With the device configuration described above, it is possible to select an optical filter 20 corresponding to a photon sent from each radiation sensing unit 2.

In the case of the corresponding radiation monitor 1 according to the present embodiment, the numbers of photodetectors 7, the counters 8, the interpretation and display devices 9 are decreased, such that a size of the radiation monitor 1 is decreased, thereby saving an installation space, decreasing introduction and operation costs, decreasing the number of inspected products and processes at the time of maintenance, and reducing erratic accuracy of measurement of a dose rate due to an influence of an individual difference of the photodetector 7.

In addition, it is possible to automate all measurements by two or more radiation sensing units 2 thereby largely reducing efforts and a time for the measurement. Further, the optical filters 20 are each connected to each photon sending unit 6, such that it is possible to apply an optimum radiation sensing unit 2 in an environment in which a plurality of different measurement targets are present.

What is claimed is:

1. A radiation monitor comprising:
   a plurality of radiation sensing units which includes phosphors emitting photons in response to an incident radiation; and
   a plurality of photon sending units which sends the photons emitted from the phosphors of the radiation sensing unit;
   an optical filter which attenuates a number of photons sent from the photon sending units;
   a photodetector which converts the photons sent from the optical filter into an electric pulse signal; and
   a light selection unit which is controlled to select any one of light sent from a first optical fiber and light sent from a second optical fiber as light to be acquired by the photodetector to be converted into an electric pulse signal,
   wherein the phosphors form a multilayer structure including a first phosphor and a second phosphor, and a photon absorbing layer absorbing a photon emitted from the phosphor is provided between the first phosphor and the second phosphor,
   wherein the optical filter is connected to the photon sending unit and the photodetector,
   wherein radiation dose rates at a plurality of different positions are measured, and
   wherein the optical filter is connected to the light selection unit and the photodetector.

2. The radiation monitor according to claim 1, wherein the first phosphor and the second phosphor form a nested structure.

3. The radiation monitor according to claim 2, wherein the phosphors each have a cylindrical shape.

4. The radiation monitor according to claim 2, wherein the phosphors each have a prism shape.

5. The radiation monitor according to claim 2, wherein the phosphors each have a hemispherical shape.

6. The radiation monitor according to claim 2, wherein a transmittance of the first phosphor and a transmittance of the second phosphor are different from each other.

7. The radiation monitor according to claim 2, wherein a density of the first phosphor and a density of the second phosphor are different from each other.

8. The radiation monitor according to claim 1, further comprising:
   a plurality of optical filters, including a first optical filter and a second optical filter,
   wherein the optical filter is connected to the first optical fiber and the light selection unit, and
   wherein the second optical filter is connected to the second optical fiber and the light selection unit.

9. A radiation monitor comprising:
   a plurality of radiation sensing units which includes phosphors emitting photons in response to an incident radiation; and
   a plurality of photon sending units which sends the photons emitted from the phosphors of the radiation sensing unit;
   an optical filter which attenuates a number of photons sent from the photon sending units;
   a photodetector which converts the photons sent from the optical filter into an electric pulse signal; and
   a light selection unit which is controlled to select any one of light sent from a first optical fiber and light sent from a second optical fiber as light to be acquired by the photodetector to be converted into an electric pulse signal;
   wherein the phosphors form a nested structure including a first phosphor and a second phosphor, and a transmittance of the first phosphor and a transmittance of the second phosphor are different from each other;
   wherein the optical filter is connected to the photon sending unit and the photodetector,
   wherein radiation dose rates at a plurality of different positions are measured, and
   wherein the optical filter is connected to the light selection unit and the photodetector.

* * * * *